United States Patent
Loosbrock

(10) Patent No.: US 6,561,399 B1
(45) Date of Patent: May 13, 2003

(54) ADJUSTABLE CONTAINER HOLDER FOR A PICKUP TRUCK

(76) Inventor: Loren E. Loosbrock, 664 14th Ave., Almena, WI (US) 54805

( * ) Notice: Subject to any disclaimer, the term of this patent is extended or adjusted under 35 U.S.C. 154(b) by 0 days.

(21) Appl. No.: 09/847,199

(22) Filed: May 3, 2001

(51) Int. Cl.$^7$ .................................................. B60R 7/00
(52) U.S. Cl. .................... 224/403; 224/42.32; 224/402; 224/404; 224/539; 224/545; 224/564; 248/311.2
(58) Field of Search ................................ 224/403, 402, 224/404, 42.32, 42.33, 539, 543, 545, 547, 542, 564; 248/311.2, 214; 296/37.1, 37.6; 220/676

(56) References Cited

U.S. PATENT DOCUMENTS

| | | | | |
|---|---|---|---|---|
| 3,036,749 A | * | 5/1962 | Evans | 224/42.32 |
| 3,893,568 A | | 7/1975 | Lile | |
| 4,227,634 A | | 10/1980 | Ramsey et al. | |
| 4,424,999 A | | 1/1984 | Commins | |
| 4,860,986 A | * | 8/1989 | Couzens | 248/310 |
| 4,865,237 A | * | 9/1989 | Allen | 224/278 |
| 5,056,696 A | * | 10/1991 | Lahr | 224/148.4 |
| 5,118,156 A | | 6/1992 | Richard | |
| 5,361,950 A | * | 11/1994 | Signal et al. | 224/482 |
| 5,573,162 A | | 11/1996 | Spencer et al. | |
| 5,799,849 A | * | 9/1998 | Beer et al. | 224/282 |
| 5,803,327 A | * | 9/1998 | Nipper et al. | 135/66 |
| 5,924,615 A | | 7/1999 | McGarrah | |
| 6,032,963 A | | 3/2000 | Daugherty | |
| 6,082,537 A | | 7/2000 | Quinn | |

* cited by examiner

Primary Examiner—Stephen K. Cronin
Assistant Examiner—Maerena W. Brevard
(74) Attorney, Agent, or Firm—Tipton L. Randall

(57) ABSTRACT

The invention is an adjustable container holder assembly that attaches to the sidewall of a pickup box above the fender well, for holding one or more liquid containers. The adjustable container holder assembly is best suited for square jugs with the opening and handle on the top, where such jugs are fabricated from plastic. The container holder assembly holds the containers above the bed of the box in an area that is of limited use due to obstruction by the fender wells. The placement of the container holder assembly adjacent to the sidewall provides easy access to the containers from outside the pickup box. The rack also protects the containers from damage by other implements that are often transported in the box bed of the pickup truck.

18 Claims, 8 Drawing Sheets

ADJUSTABLE CONTAINER HOLDER FOR A PICKUP TRUCK

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a container holder assembly, and more particularly, to an adjustable container holder assembly for attachment to a truck box sidewall.

2. Background Information

A wide variety of vehicles are employed for transporting work related items, such as tools, building materials, equipment, and containers to name only a few. A widely used vehicle for transporting such items is the utility pickup truck. These vehicles have a driver/passenger cab that can accommodate several individuals, and a pickup box located behind the cab on the vehicle chassis. The truck box is commonly an open top rectangular structure with vertical sides and a tailgate that swings down to allow easier access to the interior of the truck box. Optionally, a so-called "topper" can be fastened to the top of the side of the truck box for added protection of the truck box interior.

The placement and fastening of the truck box directly on the vehicle chassis require that wheel wells be incorporated into the bed and sides of the box to accommodate the vehicle rear wheels. The wheel wells extend into the level bed, reducing the area available for storage and transportation of items in the truck box. Thus, the area above the wheel wells in the truck box is often left open and can be considered "wasted space."

Containers that are placed in the truck box can be a problem, particularly when the truck moves over rough terrain or even on smooth roads. The containers are prone to movement as the truck accelerates, decelerates or changes direction. With other tools or materials present in the truck box, the containers are susceptible to puncture and leakage of the container contents. Many containers in use today are plastic, thereby increasing the likelihood of damage or puncture to the container and loss of contents.

Various devices for use in a truck box have been granted patents. Lile, in U.S. Pat. No. 3,893,568, describes a tool holder for a pickup truck box. The holder includes a pair of brackets that fasten to the floor of the box on each side of one wheel well close to one box sidewall. Shovels fit into the brackets and are secured with a locking mechanism to prevent theft.

In U.S. Pat. No. 4,227,634, Ramsey et al. disclose a portable container carrying rack used for holding containers in a flat bed delivery vehicle. The rack is free standing in the flat bed and has foot pads that support the rack. The rails of the rack have adjustable restraints that hold containers upright in the rack.

Commins, in U.S. Pat. No. 4,424,999, describes a carrying case for gas bottles holding gas under pressure. The case is rectangular, boxlike in form, with an open top and contains several cradles for supporting the cylindrical gas bottle on its side. Several handles and a set of wheels are present on the case exterior for ease of handling of the case.

In U.S. Pat. No. 5,118,156, Richard discloses a load support system for carrying a load above the wheel wells in the cargo box of a pickup truck. Clamping structures releasably clamp to the flanges at the top of the cargo box. Hangers from the clamps carry load support beams that span the width of the cargo box between the flanges. The load support beams allow items to be carried that would not fit between the wheel wells on the floor of the cargo box.

Spencer et al., in U.S. Pat. No. 5,573,162, disclose a utility box with partitions and a latchable top that is designed for use with an ATV vehicle. The U-shaped box has numerous exterior hooks for holding the box to the front end of the ATV vehicle.

McGarrah, in U.S. Pat. No. 5,924,615, describes a hanging storage box for truck beds. The rectangular box has multiple hanger members adjacent the hinged side of the box lid. The hangers are adjustable in position to accommodate various height truck bed walls. The box has internal antitheft bolts that secure the box to the sidewall of the truck box.

In U.S. Pat. No. 6,032,963, Daugherty discloses a rectangular water container that is secured to the side wall of a pickup truck box by an U-shaped bracket (40) to hold the container in position. The container also has a pair of wheels for transport and a pump to dispense water from the container.

U.S. Pat. No. 6,082,537 by Quinn describes a drawer tray for insertion into a desk or bureau drawer. The tray is capable of holding small items such as paper clips, buttons and such and provides an attachment device for fixing the tray to a side wall of a drawer, with the tray extending into the drawer at the top most level of the drawer so as not to interfere with items placed near the bottom of the drawer. The attachment device provides a set of spaced apart "L" shaped arms for gripping the outside surface of a side wall of the drawer and a set of spaced apart spring arms for pressing against the inside surface of the same side wall.

Applicant has invented a container holder assembly that attaches to the truck box sidewall above the wheel wells to both secure containers from damage and to utilize this little used area of the truck box. Other features and advantages of the present invention will become apparent from the following description of the adjustable container holder assembly.

SUMMARY OF THE INVENTION

The invention is an adjustable container holder assembly that attaches to the sidewall of a pickup box above the fender well, for holding one or more liquid containers. The adjustable container holder assembly includes a horizontal, linear, flat plate member having a pair of spaced apart vertical slot apertures therein, with the plate member adapted for securing to a truck box sidewall. A container holder member includes a top container-encircling band portion, a flat, container-supporting bottom portion, a pair of opposed sidewalls connecting the top band portion and the bottom support portion, and having open sides adjacent the opposed sidewalls. A pair of attachment means is secured to the band portion in register with the pair of spaced apart vertical slot apertures, with the attachment means moveably securable within the slot apertures to adjust the position of the container holder member relative to the flat plate member. The container holder assembly can be constructed to accommodate one, two, three or more containers with internal partitions separating adjacent containers. The container holder assembly is best suited for square jugs with the opening and handle on the top, when such jugs are fabricated from plastic. The container holder assembly can be fabricated from metal, such as steel, or from a polymeric material, such as a high strength plastic.

The container holder assembly holds the containers above the bed of the box in an area that is of limited use due to obstruction by the fender wells. The placement of the container holder assembly adjacent to the sidewall provides easy access to the containers from outside the pickup box. The rack also protects the containers from damage by other implements that are often transported in the box bed of the pickup truck.

DESCRIPTION OF THE PREFERRED EMBODIMENTS

Figure 1:
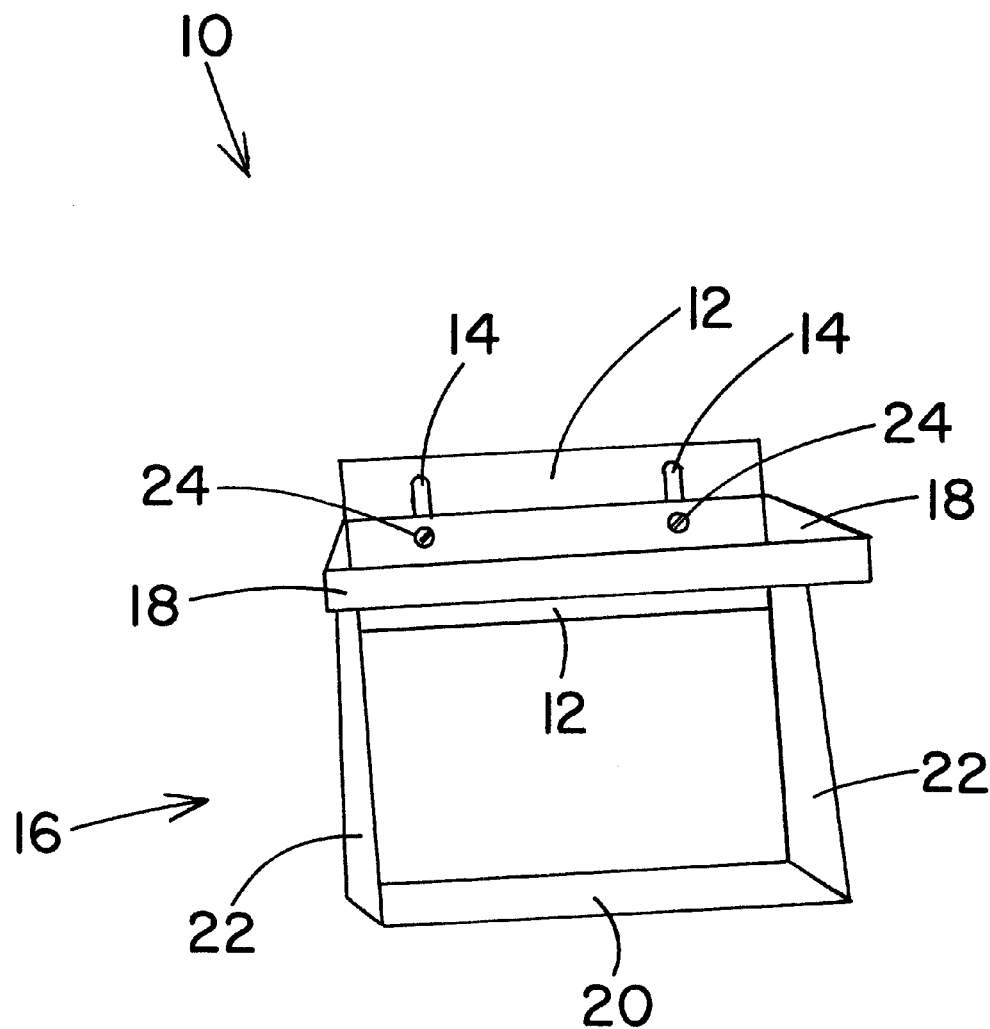
FIG. 1 is a front plan view of one embodiment of the assembly of the present invention.
Figure 2:
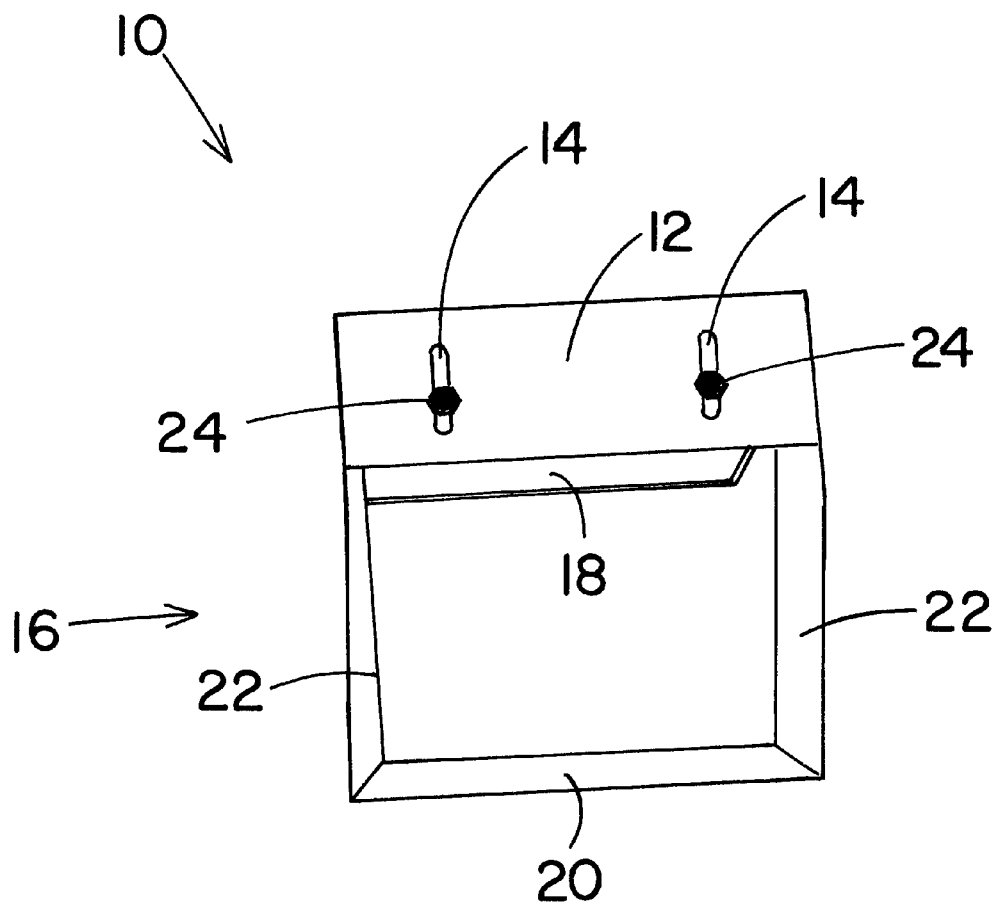
FIG. 2 is a rear plan view of the one embodiment of the assembly of the present invention.
Figure 3:
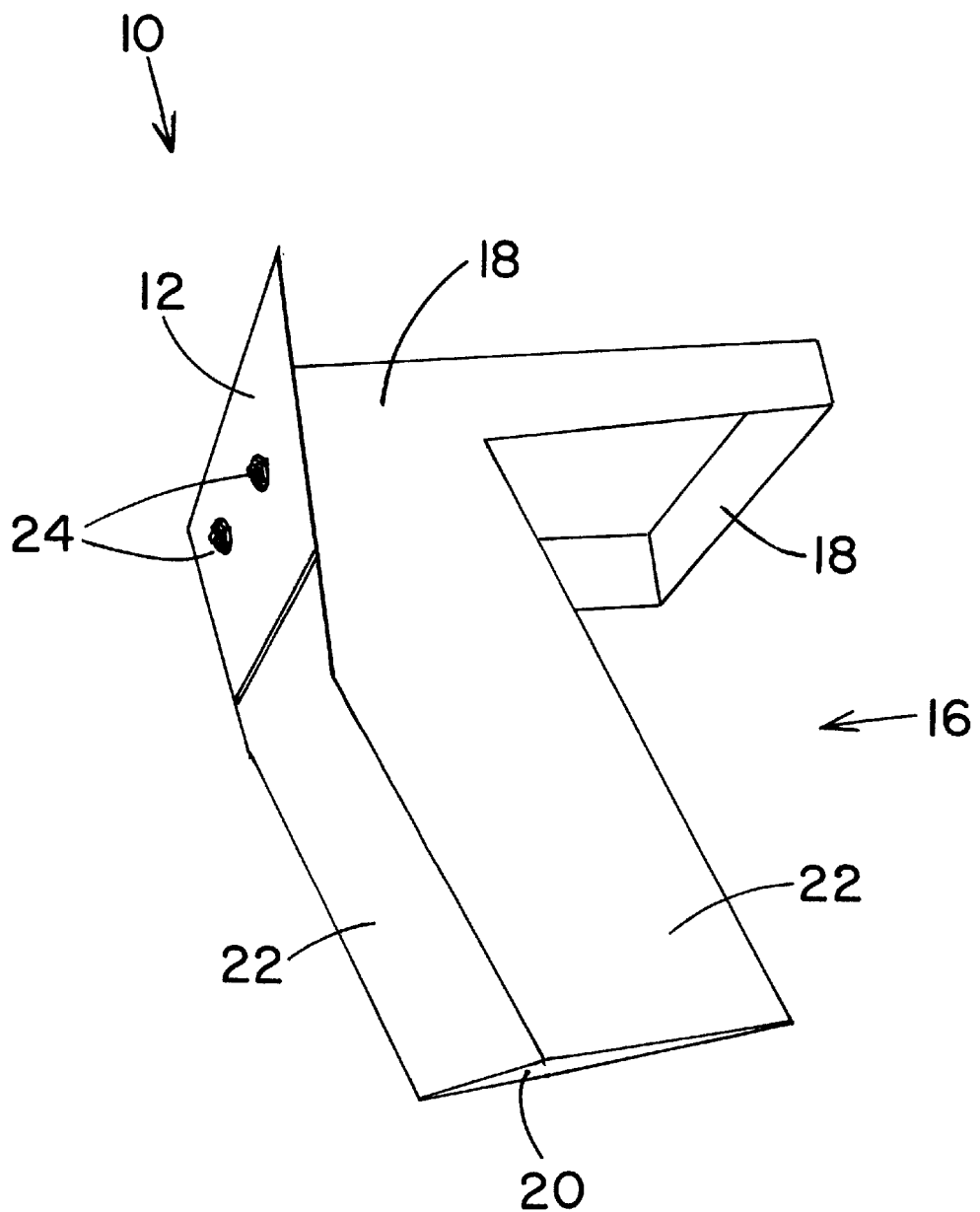
FIG. 3 is a side perspective view of the one embodiment of the assembly of the present invention.

Nomenclature
- 10 Adjustable Container Holder Assembly
- 12 Flat Plate Member
- 14 Vertical Slots in Plate Member
- 16 Container Holder Member
- 18 Top Band Portion
- 20 Flat Bottom Portion
- 22 Opposed Sidewalls
- 24 Container Holder Nut and Bolt Fasteners
- 26 Flat Plate Nut and Bolt Fasteners
- 28 Top Band Divider Partition
- 30 Sidewall Divider Partition Construction Referring to FIGS. 1–3, one embodiment of the adjustable container holder assembly 10 that the sidewall of a pickup box above the fender well is shown. The adjustable container holder assembly 10 includes a horizontal, linear, flat plate member 12, having a pair of spaced apart apertures 14 therein. The vertical slot apertures 14 of the plate member 12 are spaced with apertures near the top of a truck box sidewall. A container holder member 16 is adjustably fastened to the plate member 12, and includes a top container-encircling band portion 18, a flat, container-supporting bottom portion 20, a pair of opposed sidewall portions 22 connecting the top band portion 18 and the bottom support portion 20, and with open sides adjacent the opposed sidewall portions 22. A pair of attachment means, such as nut and bolt fasteners 24, is secured to the top band portion 18 in register with the pair of spaced apart vertical slot apertures 14, with the attachment means moveably securable within the plate member slot apertures 14 to adjust the position of the container holder member 16 relative to the flat plate member 12. The pair of opposed sidewall portions 22 are oriented perpendicular to the flat plate member 12 and extend diagonally from the top band portion 18 adjacent the nut and bolt attachment means 24 to the bottom support plate 20, as illustrated in FIG. 3. This construction provides maximum support for the bottom support plate portion 20 on which the container rests. The top ban portion 18 and bottom support plate portion are preferably rectangular to accommodate rectangular containers, as illustrated in FIGS. 1–4. The container holder assembly 10 is, of course, capable of carrying round containers that fit into the container holder member 16.

Figure 4:
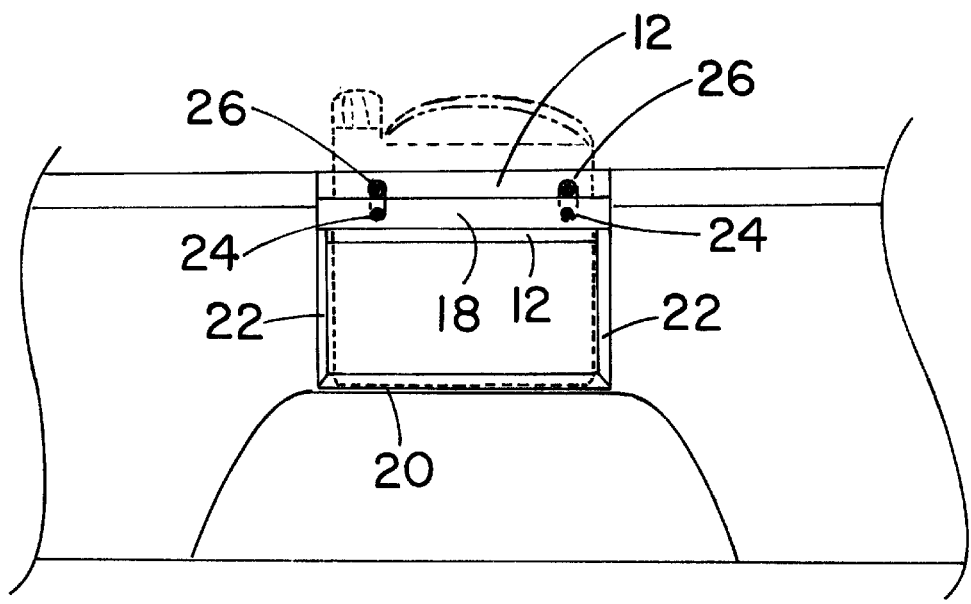
FIG. 4 is a front plan view of the one embodiment of the assembly of the present invention secured to a truck box sidewall above the wheel well.

As illustrated in FIG. 4, the flat plate member 12 is mounted near the top of a truck box sidewall above the wheel well using a second pair of nut and bolt fasteners 26 to secure the plate member 12 to apertures near the top of the truck box sidewall. The container holder member 16 is then secured to the plate member 12 by the nut and bolt attachment means 24 of the top band portion 18. The bolts of the attachment means 24 each extend through an aperture in the top band portion and on through one vertical slot aperture 14. Each bolt fits into one vertical slot aperture 14 with the container holder member 16 positioned above the wheel well, and moveably adjusted so the bottom plate portion 20 rest on the top of the wheel well for added support and stability. The vertical slot apertures 14 are sized so the container holder member 16 can be adjusted to fit the sidewall and wheel well of different sized pickup boxes. The adjustable container holder assembly 10 can be fabricated from steel plate or from high strength polymeric resin plastic for durability and corrosion resistance.

The open structure of the adjustable container holder assembly 10 prevents accumulation of water in the holder when exposed to the elements. Also, the location adjacent the truck box sidewall allows containers to be easily placed in and removed from the assembly 10 from outside the pickup box. Further, the usual dead space over the truck box wheel well is utilized for storage and transport of the containers and their contents. The elevated location of the adjustable container holder assembly 10 further protects the container held therein from damage or puncture from other implements in the truck box during transport as can occur with loose containers in the truck box.

FIGS. 5–8 shows a further embodiment of the present invention where one adjustable container holder assembly 10 is designed to hold multiple containers. The elements common to FIGS. 5–8 are given the same numbers as the corresponding elements of FIGS. 1–4.

Figure 5:
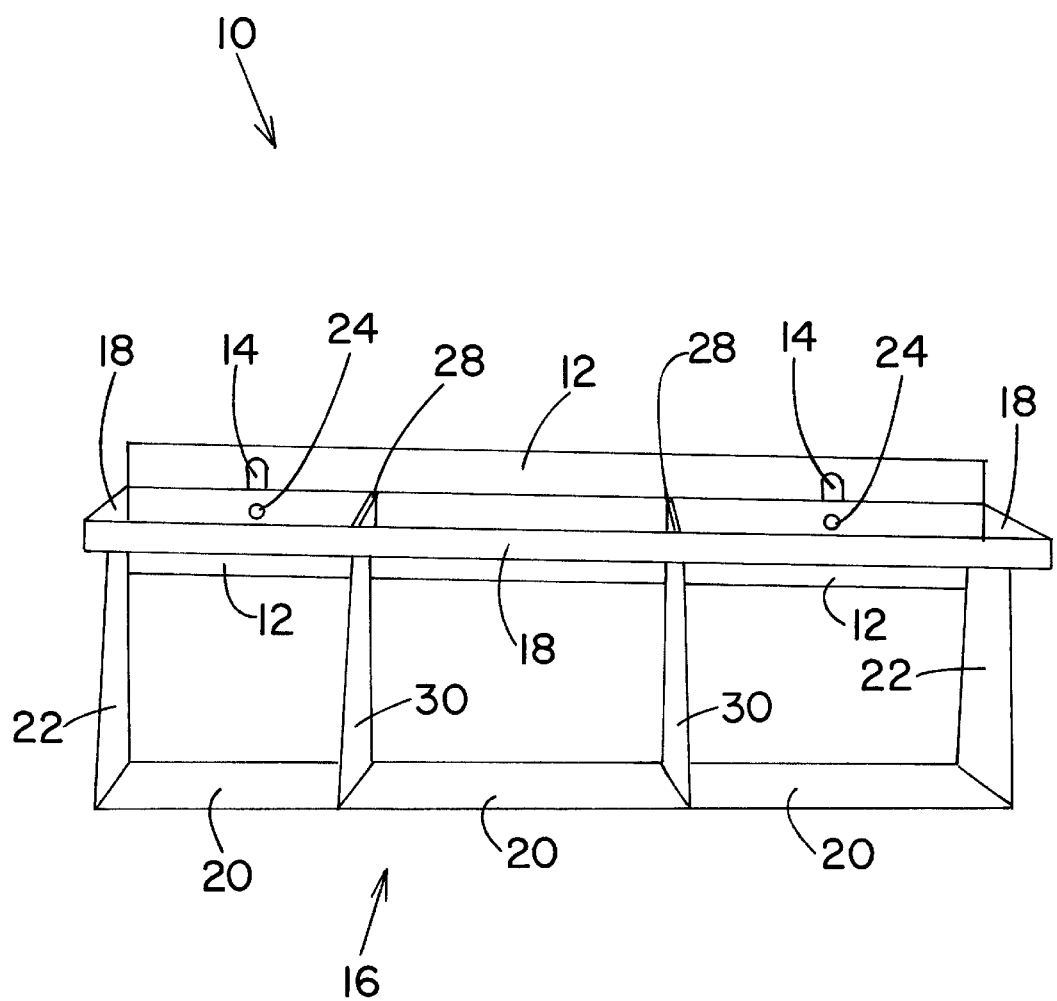
FIG. 5 is a front plan view of another embodiment of the assembly of the present invention.
Figure 6:
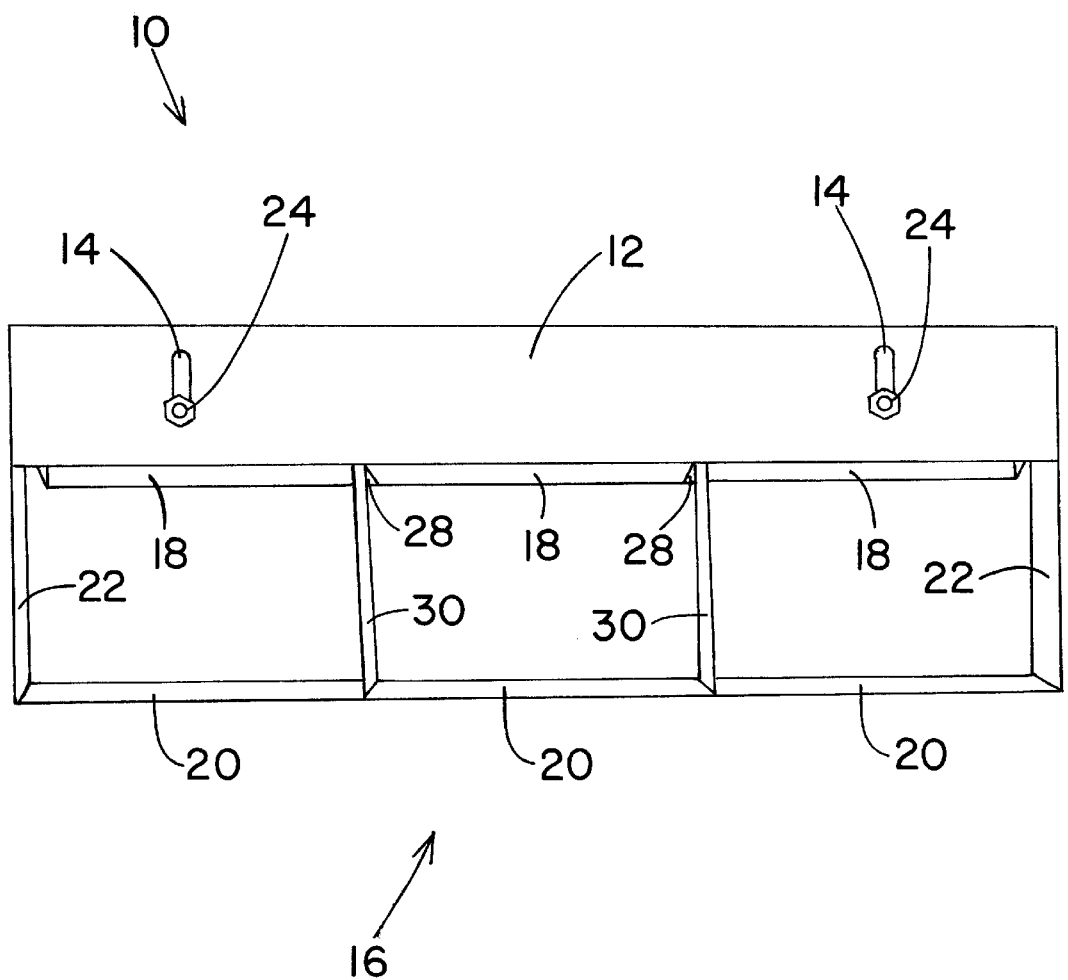
FIG. 6 is a rear plan view of the another embodiment of the assembly of the present invention.
Figure 7:
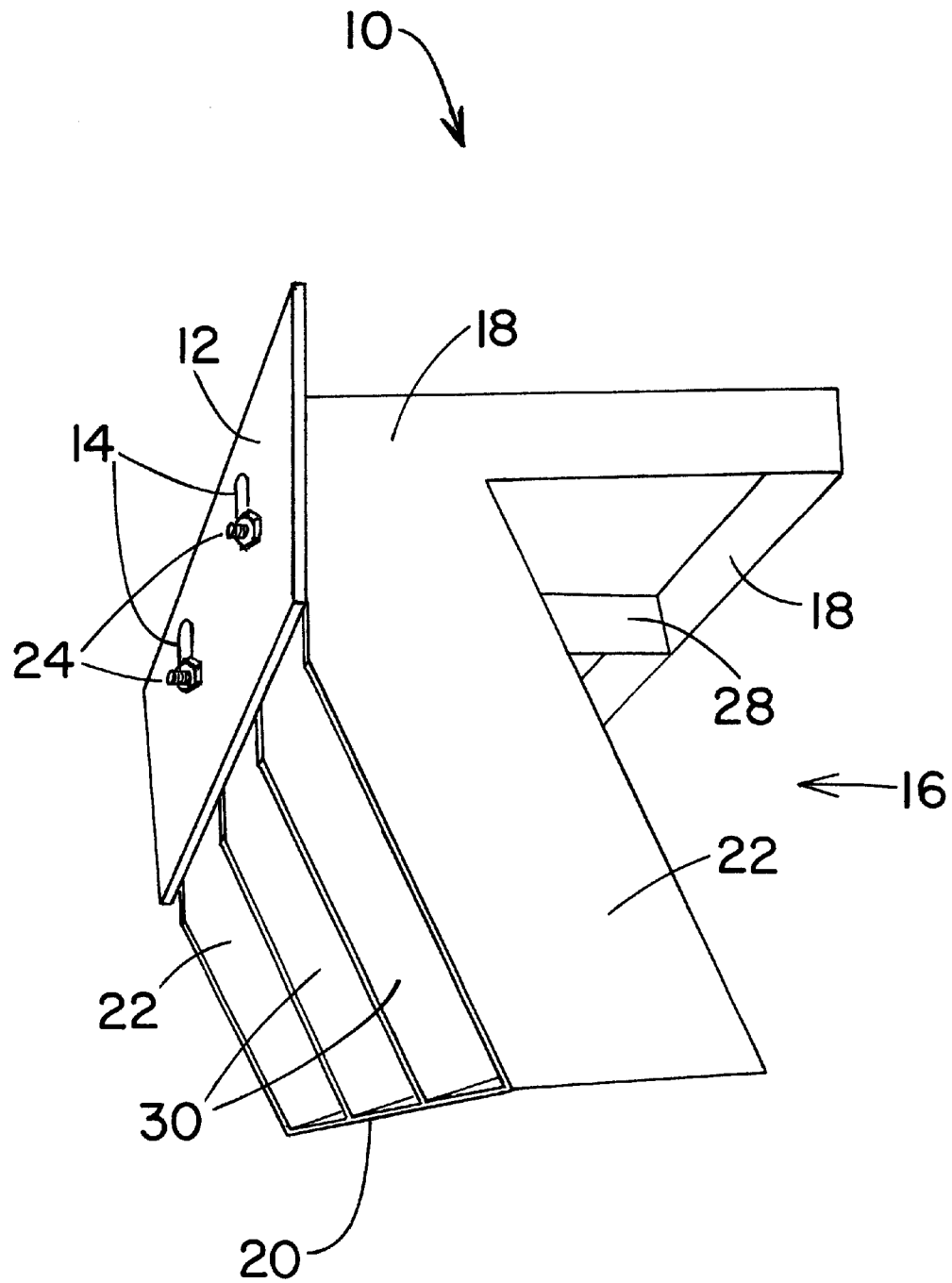
FIG. 7 is a side perspective view of the another embodiment of the assembly of the present invention.

Referring to FIGS. 5–7, a further embodiment of the adjustable container holder assembly 10 that attaches to the sidewall of a pickup box above the fender well is shown. The adjustable container holder assembly 10 includes a horizontal, linear, flat plate member 12 having a pair of spaced apart vertical slot apertures 14 therein. The vertical slot apertures 14 of the plate member 12 are spaced to coincide with apertures near the top of a truck box sidewall. A container holder member 16 is adjustably fastened to the plate member 12 and includes a top container-encircling band portion 18, a flat, container-supporting bottom portion 20, a pair of opposed sidewall portions 22 connecting the top band portion 18 and the bottom support portion 20, and with open sides adjacent the opposed sidewall portions 22. A pair of attachment means, such as nut and bolt fasteners 24, is secured to the top band portion 18 in register with the pair of spaced apart vertical slot apertures 14, with the attachment means moveably secured within the plate member slot apertures 14 to adjust the position of the container holder member 16 relative to the flat plate member 12. The pair of opposed sidewall portions 22 are oriented perpendicular to the flat plate member 12 and extend diagonally from the top band portion 18 adjacent the nut and bolt attachment means 24 to the bottom support plate 20, as illustrated in FIG. 7. The top band portion 18 is rectangular, as is the bottom support plate 20. One or more top band divider partitions 28 extend from the top band portion 18 adjacent the nut and bolt fasteners 24 therein, across to the opposite side of the top band portion 18. The band divider partitions 28, in this case two, divide the top band portion interior into a plurality of equal spaces, in this case three. A corresponding sidewall divider partition 30 extends diagonally from adjacent each band partition 28 from near the nut and bolt fasteners 24 to the bottom plate portion 20 to further divide the rectangular container holder member 16 to accommodate multiple containers. This construction provides maximum support for the bottom support plate portion 20 on which the container rests. The embodiment of the adjustable container holder assembly 10, shown in FIGS. 5–8, holds three containers, although an assembly 10 to hold two, four, five or more containers is available from this embodiment of the invention. The container holder assembly 10 is, of course, capable of carrying round containers that fit into the divided interior of the container holder member 16.

Figure 8:
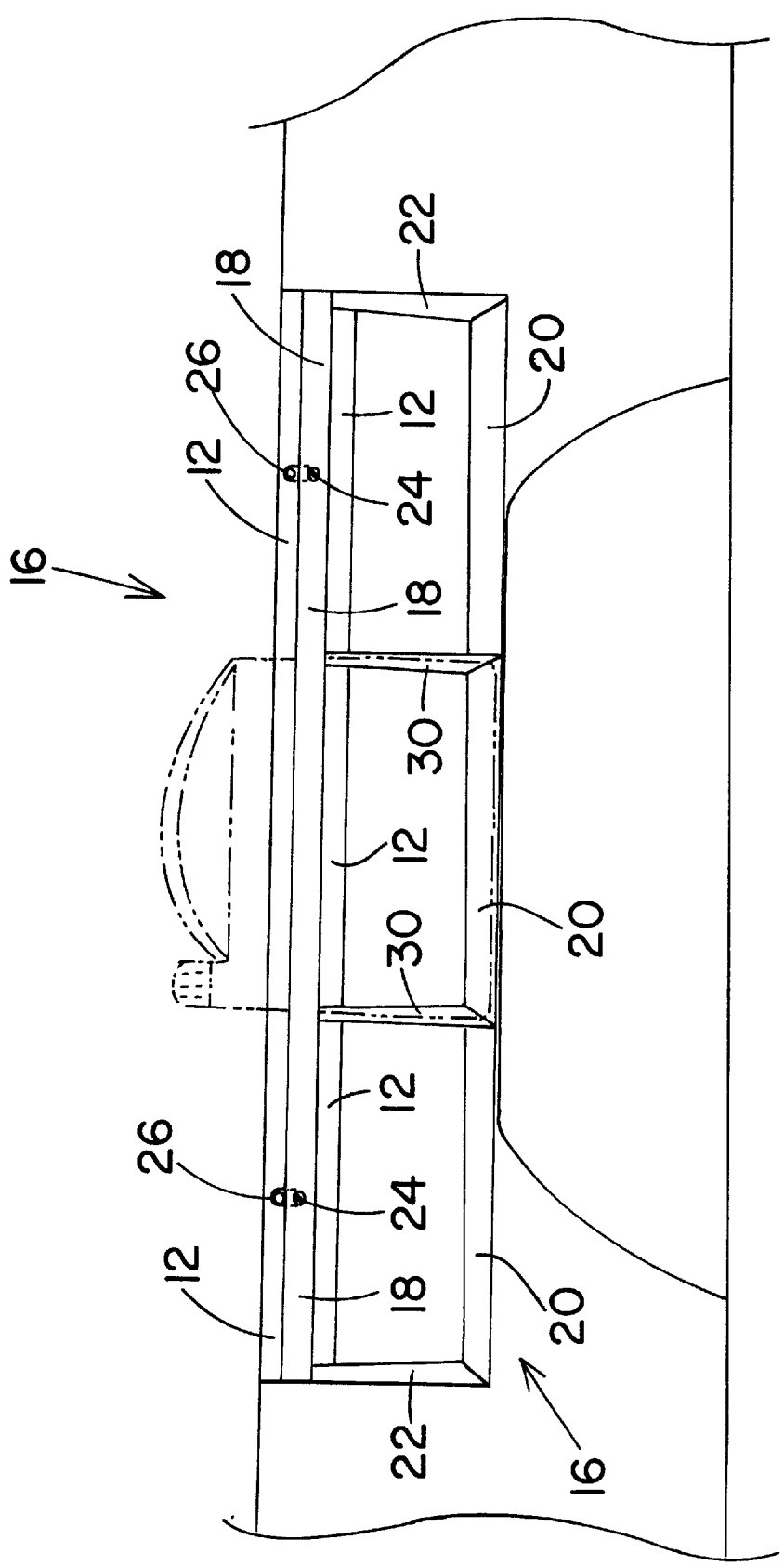
FIG. 8 is a front plan view of the another embodiment of the assembly of the present invention, secured to a truck box sidewall above the wheel well.

As illustrated in FIG. 8, the flat plate member 12 is mounted near the top of a truck box sidewall above the wheel well using a second pair of nut and bolt fasteners 26 to secure the plate member 12 to apertures near the top of the truck box sidewall. The container holder member 16 is then secured to the plate member 12 by the nut and bolt attachment means 24 of the top band portion 18. The bolts of the attachment means 24 each extend through an aperture in the top band portion and on through one vertical slot aperture 14. Each bolt fits into one vertical slot aperture 14 with the container holder member 16 positioned above the wheel well, and moveably adjusted so the bottom plate portion 20 rests on the top of the wheel well for added support and stability. The vertical slot apertures 14 are sized so the container holder member 16 can be adjusted to fit the sidewall and wheel well of different sized pickup boxes. The adjustable container holder assembly 10 can be fabricated from steel plate or from high strength polymeric resin plastic for durability and corrosion resistance.

The open structure of the adjustable container holder assembly 10 prevents accumulation of water in the holder when exposed to the elements. Also, the location adjacent the truck box sidewall allows containers to be easily placed in and removed from the assembly 10 from outside the pickup box. Further, the usual dead space over the truck box wheel well is utilized for storage and transport of the containers and their contents. The elevated location of the adjustable container holder assembly 10 further protects the container held therein from damage or puncture from other implements in the truck box during transport as can occur with loose containers in the truck box.

While the invention has been particularly shown and described with reference to preferred embodiments thereof, it will be understood by those skilled in the art that various changes in form and details may be made therein without departing from the spirit and scope of the invention.

I claim:

1. An adjustable container holder assembly for attachment to a truck box sidewall comprising;
    (a) a horizontal, linear, flat plate member having a pair of spaced apart vertical slot apertures therein, the plate member adapted for securing to a truck box sidewall;
    (b) a container holder member including a container-encircling, rectangular, top band portion to accommodate rectangular containers, a flat, container-supporting bottom portion, a pair of opposed sidewalls connecting the top band portion and the bottom support portion, the holder member having open sides adjacent the opposed sidewalls wherein the opposed sidewalls of the container holder member extend from the top band portion adjacent the band portion attachment means, diagonally to the bottom support portion; and
    (c) a pair of attachment means secured to the container holder member band portion in register with the pair of spaced apart vertical slot apertures of the flat plate member, the attachment means moveably securable within the slot apertures to secure and adjust the position of the container holder member relative to the flat plate member.

2. The adjustable container holder assembly for attachment to a truck box sidewall according to claim 1 wherein the opposed sidewalls of the container holder member are oriented perpendicular to the flat plate member.

3. The adjustable container holder assembly for attachment to a truck box sidewall according to claim 1 wherein the attachment means includes nut and bolt fasteners positioned in apertures in the top band portion.

4. The adjustable container holder assembly for attachment to a truck box sidewall according to claim 1 further including at least one top band divider partition and at least one sidewall divider partition, the partitions positioned to divide the container holder member to accommodate a plurality of containers.

5. The adjustable container holder assembly for attachment to a truck box sidewall according to claim 1 wherein the holder assembly is fabricated from steel plate material.

6. The adjustable container holder assembly for attachment to a truck box sidewall according to claim 1 wherein the holder assembly is fabricated from high strength polymeric resin material.

7. The adjustable container holder assembly for attachment to a truck box sidewall according to claim 1 further including attachment means for securing the flat plate member to the truck box sidewall.

8. An adjustable container holder assembly for attachment to a truck box sidewall comprising;
    (a) a horizontal, linear, flat plate member having a pair of spaced apart vertical slot apertures therein, the plate member adapted for securing to a truck box sidewall;
    (b) a container holder member including a top container-encircling band portion, a flat, container-supporting bottom portion, a pair of opposed sidewalls connecting the top band portion and the bottom support portion, the holder member having open sides adjacent the opposed sidewalls, the sidewalls oriented perpendicular to the flat plate member and extending from the top band portion, diagonally to the bottom support plate ; and
    (c) a pair of attachment means secured to the container holder member band portion in register with the pair of spaced apart vertical slot apertures, the attachment means moveably securable within the slot apertures to secure and adjust the position of the container holder member relative to the flat plate member.

9. The adjustable container holder assembly for attachment to a truck box sidewall according to claim 8 wherein the attachment means includes nut and bolt fasteners positioned in apertures in the top band portion.

10. The adjustable container holder assembly for attachment to a truck box sidewall according to claim 8 wherein the top band portion is rectangular to accommodate rectangular containers.

11. The adjustable container holder assembly for attachment to a truck box sidewall according to claim 8 further including at least one top band divider partition and at least one sidewall divider partition, the partitions positioned to divide the container holder member to accommodate a plurality of containers.

12. The adjustable container holder assembly for attachment to a truck box sidewall according to claim 8 wherein the holder assembly is fabricated from steel plate material.

13. The adjustable container holder assembly for attachment to a truck box sidewall according to claim 8 wherein the holder assembly is fabricated from high strength polymeric resin material.

14. The adjustable container holder assembly for attachment to a truck box sidewall according to claim 8 further including attachment means for securing the flat plate member to the truck box sidewall.

15. An adjustable container holder assembly for attachment to a truck box sidewall comprising;

(a) a horizontal, linear, flat plate member having a pair of spaced apart vertical slot apertures therein, the plate member adapted for securing to a truck box sidewall;

(b) a container holder member including a top container-encircling band portion, a flat, container-supporting bottom portion, a pair of opposed sidewalls connecting the top band portion and the bottom support portion, the holder member having open sides adjacent the opposed sidewalls, the sidewalls oriented perpendicular to the flat plate member and extending from the top band portion, diagonally to the bottom support plate, the top band portion being rectangular to accommodate rectangular containers;

(c) at least one top band divider partition and at least one sidewall divider partition, the partitions positioned to divide the container holder member to accommodate a plurality of containers; and (d) a pair of attachment means secured to the container holder member band portion in register with the pair of spaced apart vertical slot apertures of the flat plate member, the attachment means including nut and bolt fasteners positioned in apertures in the top band portion, the attachment means moveably securable within the slot apertures to secure and adjust the position of the container holder member relative to the flat plate member.

16. The adjustable container holder assembly for attachment to a truck box sidewall according to claim 15 wherein the top band divider partition extends from a first side of the rectangular top band portion adjacent the band portion attachment means to a second side of the rectangular top band portion opposite the band portion attachment means, and the sidewall divider partition extends perpendicularly from the top band portion adjacent the band portion attachment means, diagonally to the bottom support portion.

17. The adjustable container holder assembly for attachment to a truck box sidewall according to claim 15 wherein the holder assembly is fabricated from high strength polymeric resin material.

18. The adjustable container holder assembly for attachment to a truck box sidewall according to claim 15 further including attachment means for securing the flat plate member to the truck box sidewall.

\* \* \* \* \*